US009495990B2

(12) United States Patent
Kang et al.

(10) Patent No.: US 9,495,990 B2
(45) Date of Patent: Nov. 15, 2016

(54) HARD MAGNETIC EXCHANGE-COUPLED COMPOSITE STRUCTURES AND PERPENDICULAR MAGNETIC RECORDING MEDIA INCLUDING THE SAME

(71) Applicant: Samsung Electronics Co., Ltd., Suwon-Si, Gyeonggi-Do (KR)

(72) Inventors: Young-min Kang, Yongin-si (KR); Kyung-han Ahn, Seoul (KR); Sang-mock Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 176 days.

(21) Appl. No.: 14/150,317

(22) Filed: Jan. 8, 2014

(65) Prior Publication Data

US 2015/0024238 A1    Jan. 22, 2015

(30) Foreign Application Priority Data

Jul. 19, 2013    (KR) ........................ 10-2013-0085693

(51) Int. Cl.
| | |
|---|---|
| G11B 5/66 | (2006.01) |
| G11B 5/667 | (2006.01) |
| G11B 5/65 | (2006.01) |
| G11B 5/73 | (2006.01) |
| H01F 10/32 | (2006.01) |

(52) U.S. Cl.
CPC ............... *G11B 5/667* (2013.01); *G11B 5/653* (2013.01); *G11B 5/7325* (2013.01); *H01F 10/3222* (2013.01)

(58) Field of Classification Search
None
See application file for complete search history.

(56) References Cited

U.S. PATENT DOCUMENTS

| | | | | | |
|---|---|---|---|---|---|
| 4,618,537 | A | * | 10/1986 | Takano | .................. G11B 5/722 360/134 |
| 5,142,768 | A | * | 9/1992 | Aboaf | .................. G11B 5/3106 29/603.12 |
| 5,466,524 | A | | 11/1995 | Hoshi et al. | |
| 5,772,797 | A | * | 6/1998 | Nakanishi | .............. G11B 5/147 148/306 |
| 5,976,713 | A | * | 11/1999 | Fuke | ...................... B82Y 10/00 324/252 |
| 8,945,628 | B2 | * | 2/2015 | Weissleder | ........... A61K 9/5094 424/489 |
| 9,076,579 | B2 | * | 7/2015 | Hong | ........................ H01F 3/00 |
| 2009/0004475 | A1 | * | 1/2009 | Sadaka | ..................... H01F 1/24 428/403 |
| 2010/0060539 | A1 | * | 3/2010 | Suetsuna | ................... H01F 1/33 343/787 |
| 2010/0215851 | A1 | * | 8/2010 | Shoji | ..................... B22F 1/0018 427/212 |
| 2012/0183811 | A1 | * | 7/2012 | Hattori | ................... G11B 5/712 428/836 |
| 2013/0052483 | A1 | | 2/2013 | Tahmasebi et al. | |
| 2014/0132376 | A1 | * | 5/2014 | Jin | .......................... C22C 38/10 335/302 |
| 2015/0024236 | A1 | * | 1/2015 | Kang | .................... H01F 10/265 428/632 |
| 2015/0097159 | A1 | * | 4/2015 | Apalkov | ................. H01F 10/32 257/31 |

FOREIGN PATENT DOCUMENTS

| | | |
|---|---|---|
| JP | 09-251616 | 9/1997 |
| JP | 2002-109714 A | 4/2002 |
| JP | 2004-079104 A | 3/2004 |
| KR | 10-0571119 B1 | 4/2006 |
| KR | 10-0704856-81 | 4/2007 |

* cited by examiner

*Primary Examiner* — Kevin Bernatz
(74) *Attorney, Agent, or Firm* — Harness, Dickey & Pierce P.L.C.

(57) ABSTRACT

Hard magnetic exchange-coupled composite structures and perpendicular magnetic recording media including the hard magnetic exchange-coupled composite structures, include a ferrite crystal grain and a soft magnetic metal thin film bounded to the ferrite crystal grain by interfacial bonding on an atomic scale and having a thickness of about 5 nm or less, wherein a region of the soft magnetic metal thin film adjacent to an interface with the ferrite crystal grain includes an amorphous soft magnetic metal film.

16 Claims, 4 Drawing Sheets

US 9,495,990 B2

HARD MAGNETIC EXCHANGE-COUPLED COMPOSITE STRUCTURES AND PERPENDICULAR MAGNETIC RECORDING MEDIA INCLUDING THE SAME

CROSS-REFERENCE TO RELATED APPLICATION

This application claims priority under 35 U.S.C. §119 from Korean Patent Application No. 10-2013-0085693, filed on Jul. 19, 2013 in the Korean Intellectual Property Office, the disclosure of which is incorporated herein by reference in its entirety.

BACKGROUND

1. Field

The present disclosure relates to hard magnetic exchange-coupled composite structures and perpendicular magnetic recording media including the same.

2. Description of the Related Art

In recent years, due to rapidly increased quantity of information, an information storage device in which data can be recorded and/or played in high density is demanded. A magnetic recording device using a recording medium has high-capacity and/or high-speed accessibility, and thus is in the spotlight as an information storage device applicable in computers and various digital devices.

According to recording methods, magnetic recording devices may be classified into either a horizontal magnetic recording type or a perpendicular magnetic recording type. Perpendicular magnetic recording devices may have higher recording densities than horizontal magnetic recording devices.

In order to develop a recording medium using the perpendicular magnetic recording method, there is a need for a magnetic material having an increased coercivity with a high saturation magnetization value.

SUMMARY

Provided are hard magnetic exchange-coupled composite structures capable of retaining a sufficient coercivity with an increased saturation magnetization value.

Provided are perpendicular magnetic recording media including the hard magnetic exchange-coupled composite structures.

According to some example embodiments, a hard magnetic exchange-coupled composite structure includes a ferrite crystal grain; and a soft magnetic metal thin film bounded to the ferrite crystal grain by interfacial bonding on an atomic scale and having a thickness of about 5 nm or less, wherein a region of the soft magnetic metal thin film adjacent to an interface with the ferrite crystal grain includes an amorphous soft magnetic metal thin film.

The amorphous soft magnetic metal thin film may be within a 1 nm distance from the interface with the ferrite crystal grain. The amorphous soft magnetic metal thin film may be a main phase.

The ferrite crystal grain may be at least one selected from the group consisting of hexagonal ferrite, spinel ferrite, and garnet ferrite.

The soft magnetic metal may be at least one selected from the group consisting of iron (Fe), cobalt (Co), nickel (Ni), and manganese (Mn), and an alloy thereof.

The ferrite crystal grain may have a thin film structure or a particle structure.

A total thickness of the soft magnetic metal thin film may be in a range of about 2 nm to about 4 nm.

The ferrite crystal grain may have a thin film structure or a sheet structure. A thickness of the ferrite crystal grain may be in a range of about 50 nm to about 500 nm.

A thickness of the amorphous soft magnetic metal thin film in the region adjacent to the interface with the ferrite crystal grain may be in a range of about 0.1 nm to about 2 nm.

The hard magnetic exchange-coupled composite structure may further include a capping layer on the soft magnetic metal thin film. The capping layer may include at least one selected from the group consisting of tantalum (Ta), chromium (Cr), titanium (Ti), nickel (Ni), tungsten (W), ruthenium (Ru), palladium (Pd), platinum (Pt), zirconium (Zr), hafnium (Hf), silver (Ag), gold (Au), aluminum (Al), antimony (Sb), molybdenum (Mo), cobalt (Co), and tellurium (Te).

The hard magnetic exchange-coupled composite structure may further include a passivation layer.

The passivation layer may include at least one selected from the group consisting of aluminum oxide ($Al_2O_3$), magnesium oxide (MgO), titanium (Ti), aluminum (Al), and tantalum (Ta).

The ferrite crystal grain may have an M-type hexagonal ferrite crystal grain particle structure or an M-type hexagonal ferrite crystal grain thin film structure, and the amorphous soft magnetic metal thin film may be an amorphous Fe or Fe-alloy thin film.

A total thickness of the amorphous Fe or Fe-alloy thin film may be in a range of about 0.1 nm to about 2 nm.

A thickness of the M-type hexagonal ferrite crystal grain thin film structure may be in a range of about 60 nm to about 100 nm.

The M-type hexagonal ferrite crystal grain particle structure or the M-type hexagonal ferrite crystal grain thin film structure may include $SrFe_{12}O_{19}$.

The hard magnetic exchange-coupled composite structure may further include a capping layer having at least one selected from the group consisting of tantalum (Ta), chromium (Cr), titanium (Ti), nickel (Ni), tungsten (W), ruthenium (Ru), palladium (Pd), platinum (Pt), zirconium (Zr), hafnium (Hf), silver (Ag), gold (Au), aluminum (Al), antimony (Sb), molybdenum (Mo), cobalt (Co), and tellurium (Te).

According to other example embodiments, a perpendicular magnetic recording medium including the hard magnetic exchange-coupled composite structure.

BRIEF DESCRIPTION OF THE DRAWINGS

Example embodiments will be more clearly understood from the following detailed description taken in conjunction with the accompanying drawings.

FIGS. 1 to 3 are schematic views illustrating structures of hard magnetic exchange-coupled composite structures according to example embodiments;

FIG. 4 is a schematic view illustrating a structure of a perpendicular magnetic recording medium using a hard magnetic exchange-coupled composite structure according to example embodiments;

FIG. 5 is a graph showing magnetization characteristics of hard magnetic exchange-coupled composite structures of Examples 1 to 3 and structures of Comparative Examples 1 and 2;

FIG. 6 is a bright field image of the entire thin films of the hard magnetic exchange-coupled composite structure of Example 2;

FIG. 7 is a high resolution transmission electron microscope (HR-TEM) image of an interfacial region between a SrM thin film and an Fe thin film in the hard magnetic exchange-coupled composite structure of Example 2;

FIG. 8 is a scanning transmission electron microscope (STEM) z-contrast image illustrating different contrasts depending on a composition of the hard magnetic exchange-coupled composite structure of Example 2; and FIG. 9 is an energy dispersive X-ray analysis (EDAX) line profile image illustrating a composition profile along a line shown in FIG. 8.

DETAILED DESCRIPTION

Figure 1:
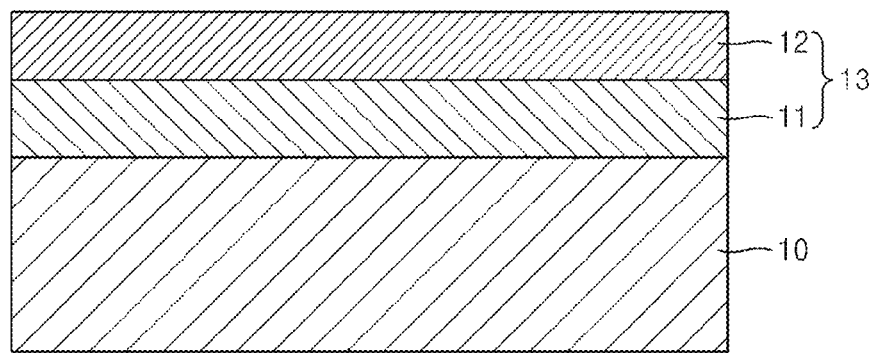
FIGS. 1-9 represent non-limiting, example embodiments as described herein.

Various example embodiments will now be described more fully with reference to the accompanying drawings in which some example embodiments are shown. However, specific structural and functional details disclosed herein are merely representative for purposes of describing example embodiments. Thus, the invention may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Hereinafter, example embodiments of one or more hard magnetic exchange-coupled composite structures and perpendicular magnetic recording media using the hard magnetic exchange-coupled composite structures will be described in detail with respect to attached drawings.

According to some example embodiments, there is provided a hard magnetic exchange-coupled composite structure including a ferrite crystal grain and a soft magnetic metal thin film bounded to the ferrite crystal grain by interfacial bonding on atomic scale and having a thickness of about 5 nm or less, wherein an amorphous soft magnetic metal thin film is in a region of the soft magnetic metal thin film adjacent to an interface with the ferrite crystal grain.

The amorphous soft magnetic metal thin film may be an amorphous or an amorphous-like soft magnetic thin film having a low crystallinity. In this regard, the amorphous or amorphous-like soft magnetic metal thin film may have a magnetic moment that is half, or less than half, of a magnetic moment of a crystalline soft magnetic metal thin film.

The amorphous soft magnetic metal thin film may be present as a main phase in a region adjacent within a 1 nm distance from the interface with the ferrite crystal grain. For example, a crystalline soft magnetic metal thin film may be present as an auxiliary phase.

For example, the region adjacent within a 1 nm distance may be a region adjacent within a distance of about 0.8 nm or about 0.5 nm from the interface with the ferrite crystal grain.

The hard magnetic exchange-coupled composite structure may include the hard magnetic ferrite crystal grain and a soft magnetic metal undergone hard magnetization by magnetic exchange coupling with hard magnetic ferrite crystal grain. In the hard magnetic exchange-coupled composite structure, the soft magnetic metal of the soft magnetic metal thin film itself may have weak spin orientation capability, and accordingly may be more easily affected by spins of the adjacent hard magnetic ferrite crystal grains, and undergo hard magnetization.

Definitions of the terminologies "main phase", "auxiliary phase", and "interfacial bonding on an atomic scale" used herein are as follows.

The terminology "main phase" refers to a phase that is thicker or more bulky than the "auxiliary phase".

The terminology "interfacial bonding on an atomic scale" refers that a ferrite crystal grain as a main phase is directly bonded to a soft magnetic metal as an auxiliary phase by interfacial bonding on an atomic scale, without an intermediate material or an interlayer therebetween.

According to example embodiments, in the hard magnetic exchange-coupled composite structure, hard magnetic exchange coupling occurs between the hard magnetic ferrite crystal grain and the soft magnetic metal, so that the soft magnetic metal may comply with magnetization behavior of the hard magnetic ferrite crystal grain. As a result, the hard magnetic exchange-coupled composite structure may retain a high saturation magnetization value of the soft magnetic metal, and have an increased coercivity like the hard magnetic ferrite crystal grain, and thus may have significantly improved hard magnetic characteristics. Therefore, the hard magnetic composite structure may have more improved magnetic characteristics compared to existing hard magnetic ferrite materials, and thus may be applicable in a perpendicular magnetic recording medium or a permanent magnet device of a magnetic circuit using hard magnetic materials. Consequently, the perpendicular magnetic recording medium or the permanent magnet device of a magnetic circuit may also have a significantly improved magnetic performance.

The hard magnetic ferrite crystal grain may be in the form of particles or in the form of a thin film.

According to some example embodiments, the soft magnetic metal thin film and the ferrite crystal grain may be bound by interfacial bonding on an atomic scale while retaining their own separate particles. According to other example embodiments, the soft magnetic metal thin film and the ferrite crystal grain may coexist as domains within a single grain.

According to example embodiments, the ferrite crystal grain may be in the form of a thin film or a sheet, and may have a thickness in a range of about 50 nm to about 500 nm.

A thickness of the ferrite crystal grain thin film or the ferrite crystal grain sheet may be, for example, equal to or greater than a diameter of the ferrite crystal grain.

A thickness of the soft magnetic metal thin film that is in the region adjacent to the interface with the hard magnetic ferrite crystal grain for hard magnetization of the soft magnetic metal may be equal to or less than 5 nm as described above. In some example embodiments, the thickness may be in a range of about 2 to about 4 nm, and in some other example embodiments, may be 2 nm, 3 nm, or 4 nm. In this regard, the hard magnetic ferrite crystal grain may be, for example, in the form of a thin film.

A thickness of the amorphous soft magnetic metal thin film that is in the region adjacent to the interface with ferrite crystal grains may be from about 0.1 to about 2 nm, for example, about 0.8 nm.

A thickness of the hard magnetic ferrite crystal grain thin film or a diameter of the hard magnetic ferrite crystal grain may be in a range of about 50 nm to about 500 nm, and in some example embodiments, in a range of about 50 nm to about 100 nm, and in some other example embodiments, in a range of about 60 nm to about 100 nm. When the hard magnetic ferrite crystal grain thin film or the hard magnetic ferrite crystal grain has a thickness or a diameter within these ranges, the hard magnetic exchange-coupled composite structure may have good hard magnetic characteristics.

According to example embodiments, a thickness ratio of the hard magnetic ferrite crystal grain thin film to the soft magnetic metal thin film may be in a range of about 15:1 to about 30:1. When the thickness ratio is within this range, the hard magnetic exchange-coupled composite structure may have good hard magnetic characteristics.

The bonding of the amorphous soft magnetic metal thin film to the hard magnetic ferrite crystal grain by interfacial bonding on atomic scale may be confirmed by transmission electron microscopy (TEM).

In some example embodiments, a soft magnetic metal of a soft magnetic metal thin film in a far distance from the interface with the hard magnetic ferrite crystal grain, not directly adjacent thereto, may have an amorphous structure, a crystalline structure, a polycrystalline structure or a mixed amorphous and crystalline structure.

The hard magnetic ferrite crystal grain may be a hexagonal ferrite crystal grain including phase such as an M-type, an U-type, a W-type, an X-type, an Y-type, or a Z-type.

The hard magnetic ferrite crystal grain may include hexaferrite having a hexagonal crystalline structure. The hexaferrite may be, for example, an M-type hexaferrite (e.g., $AFe_{12}O_{19}$, where A is Ba, Sr, Ca, and Pb, or a mixture thereof) or a W-type hexaferrite (e.g., $AM_2Fe_{16}O_{27}$, where A is Ba, Sr, Ca, and Pb, or a mixture thereof, and M is Co, Ni, Cu, Mg, Mn, or Zn).

The hard magnetic ferrite crystal grain may include spinel ferrite ($MeFe_2O_4$) having a cubic crystalline structure (where Me is at least one transition metal selected from Mn, Zn, Co, and Ni), or may include a garnet ferrite ($Y_3Fe_5O_1$, where Y is yttrium or a rare earth element).

For example, the spinel ferrite may be $MnZnFe_2O_4$ or $NiZnFe_2O_4$.

Any metal having soft magnetic characteristics may be used as a soft magnetic metal. The soft magnetic metal may be at least one selected from iron (Fe), cobalt (Co), nickel (Ni), and manganese (Mn), and an alloy thereof.

According to other example embodiments, the soft magnetic metal may be Fe or a Fe-alloy.

According to example embodiments, the hard magnetic exchange-coupled composite structure may further include a capping layer to prevent oxidation of the soft magnetic metal. For example, the capping layer may include at least one layer.

The capping layer may include at least one selected from tantalum (Ta), chromium (Cr), titanium (Ti), nickel (Ni), tungsten (W), ruthenium (Ru), palladium (Pd), platinum (Pt), zirconium (Zr), hafnium (Hf), silver (Ag), gold (Au), aluminum (Al), antimony (Sb), molybdenum (Mo), cobalt (Co), and tellurium (Te). A thickness of the capping layer is not particularly limited, but may be in a range of about 1 to about 50 nm.

According to example embodiments, the hard magnetic exchange-coupled composite structure may further include a passivation layer. For example, the passivation layer may include at least one layer.

The passivation layer may prevent oxidation of internal soft magnetic metal layers to protect the same. The passivation layer may include, for example, at least one selected from the group consisting of aluminum oxide ($Al_2O_3$), magnesium oxide (MgO), Ti, Al, and Ta.

According to example embodiments, the hard magnetic exchange-coupled composite structure may include an M-type hexagonal ferrite crystal grain having a thickness in a range of about 50 nm to about 500 nm, for example, about 60 nm to about 100 nm.

According to example embodiments, a total thickness of the soft magnetic metal thin films bounded to the interface with the ferrite crystal grains by interfacial bonding on atomic scale may be about 3 nm, and a thickness of the amorphous soft magnetic metal thin films in the region adjacent to the interface with the ferrite crystal grain may be about 0.8 nm. The rest of the soft magnetic metal thin film may have a crystalline structure.

FIG. 1 is a schematic view illustrating a structure of a hard magnetic exchange-coupled composite structure according to some example embodiments.

Referring to FIG. 1, a hard magnetic exchange-coupled composite structure 13 includes a ferrite crystal grain thin film 11 disposed on a substrate 10, and a soft magnetic metal thin film 12 disposed on the ferrite crystal grain thin film 11. An amorphous soft magnetic metal thin film is present in a region adjacent to the interface with the hard magnetic ferrite crystal grain thin film 11.

Any substrate able to support the ferrite crystal grain thin film 11 may be used as the substrate 10. Examples of the substrate 10 are Si, $SiO_2$/Si, Sapphire, $SrTiO_3$, $LaAlO_3$, and MgO substrates.

Figure 2:
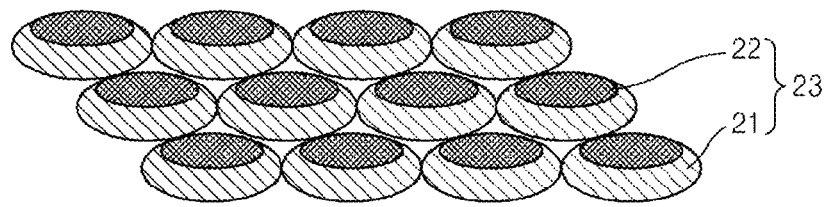
Figure 3:
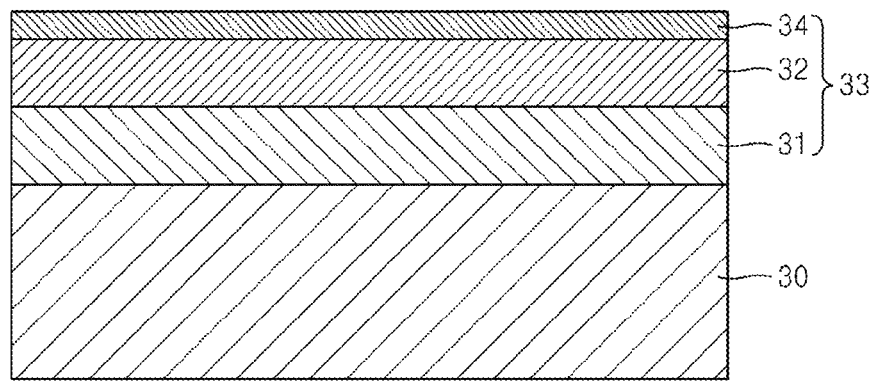

FIGS. 2 and 3 are schematic views illustrating structures of hard magnetic exchange-coupled composite structures according to other example embodiments.

Referring to FIG. 2, a hard magnetic exchange-coupled composite structure 23 includes a soft magnetic metal thin film 22 disposed on hard magnetic ferrite crystal grain particles 21. An amorphous soft magnetic metal thin film is in a region adjacent to the interface with the hard magnetic ferrite crystal grain particles 21.

The configuration of the interface between the soft magnetic metal thin film and the hard magnetic ferrite crystal grain particles is not limited. For example, the interface between the soft magnetic metal thin film and the hard magnetic ferrite crystal grain particles may be non-coplanar. As another example, the interface with the hard magnetic ferrite crystal grain particles may be formed along sidewalls of the soft magnetic metal thin film.

Referring to FIG. 3, a hard magnetic exchange-coupled composite structure 33 sequentially includes a substrate 30, a ferrite crystal grain thin film 31, and a soft magnetic metal thin film 32. A capping layer 34 is disposed on the soft magnetic thin film 32 to prevent oxidation of the soft magnetic metal of the soft magnetic metal thin film 32.

The hard magnetic exchange-coupled composite structure of FIG. 2 may also further include a capping layer on the soft magnetic metal thin film 22, like the hard magnetic exchange-coupled composite structure of FIG. 3.

The hard magnetic exchange-coupled composite structure (may include M-type hexagonal ferrite crystal grain particles or an M-type hexagonal ferrite crystal grain thin film, and a Fe or Fe-alloy thin film.

According to example embodiments, a total thickness of the amorphous Fe or Fe-alloy thin films may be equal to or less than 5 nm, for example, in a range of about 2 nm to about 4 nm.

A thickness of the M-type hexagonal ferrite crystal grain thin film may be in a range of about 60 nm to about 100 nm, and that of the amorphous Fe or Fe-alloy thin film present in the region adjacent to the interface with the M-type hexagonal ferrite crystal grain thin film may be in a range of about 0.1 nm to about 2 nm.

The M-type hexagonal ferrite crystal grain particles or the M-type hexagonal ferrite crystal grain thin film may include $SrFe_{12}O_{19}$.

Hereinafter, a method of preparing a hard magnetic exchange-coupled composite structure according to the above-described example embodiments will be described.

A hard magnetic ferrite crystal grain thin film or hard magnetic ferrite crystal grain particles are formed on a substrate by using hard magnetic ferrites.

Any method of forming hard magnetic ferrite crystal grain thin films or hard magnetic ferrite crystal grain particles known in the art may be used.

The hard magnetic ferrite crystal grain thin film may be formed by, for example, deposition, coating, or the like.

The deposition may be physical-chemical vapor deposition.

The physical-chemical vapor deposition may be sputtering, pulsed laser deposition (PLD), molecular beam epitaxy (MBE), ion plating or ion beam deposition.

In some example embodiments, the hard magnetic ferrite crystal grain thin film or hard magnetic ferrite crystal grain particles may be deposited by PLD. This will be described below in greater detail.

First, a target as a bulk sintered body may be manufactured using hard magnetic ferrite crystal grains by, for example, a solid state process.

The obtained target may be deposited on a substrate by PLD, and then thermally treated to form a hard magnetic ferrite crystalline thin film or hard magnetic ferrite crystal grain particles.

The thermal treatment may be performed in an air or oxygen atmosphere at a temperature in a range of about 800° C. to about 1,100° C. When the temperature of the thermal treatment is within this range, a hard magnetic ferrite crystal grain thin film or hard magnetic ferrite crystal grain particles having good performance may be obtained.

Then, a soft magnetic metal thin film may be formed on the hard magnetic ferrite crystal grain thin film or hard magnetic ferrite crystal grain particles.

The soft magnetic metal thin film may be formed by deposition, deep coating, spray coating, atomization, or the like. For example, the soft magnetic metal thin film may be formed by deposition, like the hard magnetic ferrite crystal grain thin film. In some other example embodiments, the soft magnetic metal thin film may be formed by deep coating in which hard ferrite crystal grain particles are added to a solution from which soft magnetic metals may be precipitated, or by atomization or spray coating.

The depositing of the soft magnetic metal thin film may be performed at a substrate temperature of room temperature, or a temperature equal to or less than 100° C. When the temperature of the substrate is within these ranges, the soft magnetic metal thin film may be in an amorphous state or an amorphous-like state having a low crystallinity.

The amorphous or amorphous-like soft magnetic metal thin film may be formed to have a thickness equal to or less than 5 nm. When the thickness is within this range, the soft magnetic metal may be apt (or, prone) to hard magnetization by the hard magnetic ferrite crystal grain, and thus form a hard magnetic exchange-coupled composite structure having excellent hard magnetic characteristics.

In some example embodiments, the soft magnetic metal thin film may be formed by sputtering.

In order to form the amorphous soft magnetic metal thin film, processing conditions may be properly controlled in terms of sputtering power, deposition pressure, deposition temperature, and deposition distance.

The sputtering may be performed in an inert gas atmosphere at a sputtering pressure in a range of about 0.001 to about 50 mTorr. The inert gas may be argon gas or nitrogen gas.

In regard to the sputtering conditions, a temperature of the substrate may be as low as 200° C. or less, for example, in a range of room temperature (between 20 to 25° C.) to about 100° C., a sputtering power may be in a range of about 20 W to about 50 W, and a distance between a sputtering target and the substrate may be as far as possible, for example, in a range of about 5 cm to about 50 cm. The sputtering may be performed for about 100 minutes to about 1,000 minutes. The higher the pressure of the inert gas such as argon, the lower the energy of metal atoms/ions sputtered by dispersion may be. For example, the pressure of the inert gas may be in a range of about 1 to about 70 mTorr.

When the sputtering conditions are within the above ranges, a hard magnetic exchange-coupled composite structure including the amorphous soft magnetic metal thin film in the region adjacent to the interface with ferrite crystal grain may be formed.

Figure 4:
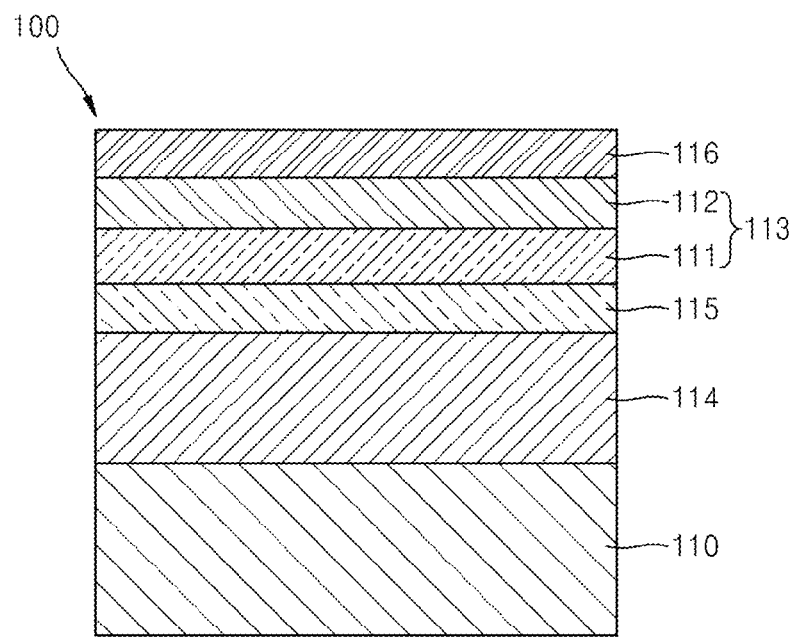

FIG. 4 is a cross-sectional view schematically illustrating a perpendicular magnetic recording medium using the hard magnetic exchange-coupled composite structure according to example embodiments.

Referring to FIG. 4, a perpendicular magnetic recording medium 100 includes a substrate 110, a soft magnetic underlayer 114, an intermediate layer 115, a recording layer 113, and a protective layer 116, which are sequentially stacked.

The recording layer 113 as a magnetic recording layer is formed using any of the hard magnetic composite structures according to the above-described example embodiments. The recording layer 113 includes a ferrite crystal grain thin film 111 and a soft magnetic metal thin film 112. In some example embodiments, the ferrite crystal grain thin film 111 and the soft magnetic metal thin film 112 may be stacked in a reverse order. Although FIG. 4 illustrates an example embodiment in which the ferrite crystal grain thin film 111 and the soft magnetic metal thin film 112 are each stacked as a separate single layer, the ferrite crystal grain thin film 111 and the soft magnetic metal thin film 112 may each be formed as multiple layers if needed.

The soft magnetic layer 114 may be a control layer with a single- or multi-layer structure for forming a perpendicular magnetic path on the recording layer 113 by pulling a magnetic field generated by a record head during magnetic recording. Any material used for soft magnetic layers of general perpendicular magnetic recording media may be used for the soft magnetic layer 114, and examples thereof is a material having a Co-based amorphous structure and a soft magnetic material including Fe or Ni.

A seed layer including Ta or Ta alloys may be disposed between the substrate 110 and the soft magnetic layer 114 to grow the soft magnetic layer 114. In addition, a buffer layer or a magnetic domain control layer may be further disposed between the substrate 100 and the soft magnetic layer 114. Such configurations are already well known in the art, and thus a detailed description thereof will be omitted.

The intermediate layer 115 may be disposed underneath the recording layer 113 to improve crystallographic orientation and magnetic characteristics of the recording layer 113. The intermediate layer 115 may be selected according to a material and a crystal structure of the recording layer 113. For example, the intermediate layer 115 may be formed in a single layer or multiple layers including alloys of Ru, Ru oxide, MgO, or Ni.

The protective layer 116 for protecting the recording layer 113 from the outside may include a diamond-like-carbon (DLC) protective layer and a lubricant layer. The DLC protective layer may be formed by depositing DLC to increase surface hardness of the perpendicular magnetic recording medium 100.

The lubricant layer may include a tetraol lubricant, and may reduce abrasion of a magnetic head and the DLC protective layer caused by collision with the head and sliding of the head.

In regard to a magnetic recording method of the perpendicular magnetic recording medium, the recording head releases a recording field corresponding to given information, to a perpendicular magnetic recording medium.

Hereinafter, example embodiments will be described in detail with reference to the following examples. However, these examples are not intended to limit the scope of the example embodiments.

COMPARATIVE EXAMPLE 1

Manufacture of a Structure $SrCO_3$ and $Fe_2O_3$ source material powder were weighed in a mole ratio of Sr to Fe of 1:11.5 to form a disk-shaped sintered body target having a diameter of about 2 inches.

A pulsed laser deposition (PLD) process was performed using the sintered body to deposit an M-type Sr ferrite ($SrFe_{16}O_{19}$, hereinafter referred to as a SrM) on a $Si/SiO_2$ substrate. Next, the resulting structure was thermally treated in the air at a temperature of 970° C. to form a SrM thin film having a thickness of about 60 nm on the $Si/SiO_2$ substrate, thereby forming a $Si/SiO_2/SrM$ (having a thickness of about 60 nm) structure.

During the PLD process, a distance between the target and the $Si/SiO_2$ substrate was about 7 cm, and a laser energy density was about 2 $J/cm^2$. The PLD process was performed in an oxygen atmosphere at about 50 mTorr and a vacuum condition of about $6\times10^{-6}$ Torr. The temperature of the substrate was controlled to a temperature of about 400° C.

Then, iron (Fe) was deposited on the $Si/SiO_2/SrM$ structure to a thickness of 10 nm by DC sputtering under vacuum conditions.

The DC sputtering conditions were as follows. The substrate temperature was room temperature, the distance between the target and the substrate was about 20 cm, the DC sputtering power was 30 W, and the base pressure was about $2\times10^{-6}$ Torr, and an inert gas atmosphere was created using argon gas at about 50 mTorr.

Still in the vacuum state, titanium (Ti) was sputtered against the Fe thin film to form a Ti capping layer having a thickness of 50 nm, thereby manufacturing a structure including the Si/SiO$_2$ substrate, the SrM thin film (having a thickness of 60 nm), the Fe thin film (having a thickness of 10 nm), and the Ti capping layer.

COMPARATIVE EXAMPLE 2

Manufacture of a Structure

SrCO$_3$ and Fe$_2$O$_3$ source material powder were weighed in a mole ratio of Sr to Fe of 1:11.5 to form a disk-shaped sintered body target having a diameter of about 2 inches.

A PLD process was performed using the sintered body to deposit an M-type Sr ferrite (SrFe$_{16}$O$_{19}$, hereinafter referred to as a SrM) on a Si/SiO$_2$ substrate. Next, the resulting structure was thermally treated in the air at a temperature of 970° C. to form a SrM thin film having a thickness of about 60 nm on the Si/SiO$_2$ substrate, thereby forming a Si/SiO$_2$/SrM (having a thickness of about 60 nm) structure.

During the PLD process, a distance between the target and the Si/SiO$_2$ substrate was about 7 cm, and a laser energy density was about 2 J/cm$^2$. The PLD process was performed in an oxygen atmosphere at about 50 mTorr and a vacuum condition of about $6\times10^{-6}$ Torr. The temperature of the substrate was controlled to a temperature of about 400° C.

EXAMPLE 1

Manufacture of a Hard Magnetic Exchange-Coupled Composite Structure

SrCO$_3$ and Fe$_2$O$_3$ source material powder were weighed in a mole ratio of Sr to Fe of 1:11.5 to form a disk-shaped sintered body target having a diameter of about 2 inches.

A pulsed laser deposition (PLD) process was performed using the sintered body to deposit an M-type Sr ferrite (SrFe$_{16}$O$_{19}$, hereinafter referred to as a SrM) on a Si/SiO$_2$ substrate. Next, the resulting structure was thermally treated in the air at a temperature of 970° C. to form a SrM thin film having a thickness of about 60 nm on the Si/SiO$_2$ substrate, thereby forming a Si/SiO$_2$/SrM (having a thickness of about 60 nm) structure.

During the PLD process, a distance between the target and the Si/SiO$_2$ substrate was about 7 cm, and a laser energy density was about 2 J/cm$^2$. The PLD process was performed in an oxygen atmosphere at about 50 mTorr and a vacuum condition of about $6\times10^{-6}$ Torr. The temperature of the substrate was controlled to a temperature of about 400° C.

Then, Fe was deposited on the Si/SiO$_2$/SrM structure to a thickness of 2 nm by DC sputtering method under vacuum conditions at room temperature (about 25° C.). Still in the vacuum state, Ti was deposited to form a Ti capping layer having a thickness of 50 nm, thereby obtaining a hard magnetic exchange-coupled composite structure including the Si/SiO$_2$ substrate, the SrM thin film (having a thickness of 60 nm), the Fe thin film (having a thickness of 2 nm), and the Ti capping layer (having a thickness of 50 nm).

The DC sputtering conditions were as follows. The substrate temperature was room temperature, the distance between the target and the substrate was about 20 cm, the DC sputtering power was 30 W, and the base pressure was about $2\times10^{-6}$ Torr in an argon gas atmosphere at about 50 mTorr.

EXAMPLE 2

Manufacture of a Hard Magnetic Exchange-Coupled Composite Structure

A hard magnetic exchange-coupled composite structure including a Si/SiO$_2$ substrate, a SrM thin film (having a thickness of 60 nm), and a Fe thin film (having a thickness of 3 nm) was obtained in the same manner as Example 1, except that Fe was deposited on the composite structure of Example 1 including the Si/SiO$_2$ substrate and the SrM thin film by sputtering in a vacuum condition to form the Fe thin film having a thickness of 3 nm.

EXAMPLE 3

Manufacture of a Hard Magnetic Exchange-Coupled Composite Structure

A hard magnetic exchange-coupled composite structure including a Si/SiO$_2$ substrate, a SrM thin film (having a thickness of 60 nm), and a Fe thin film (having a thickness of 4 nm) was obtained in the same manner as Example 1, except that. Fe was deposited on the composite structure of Example 1 including the Si/SiO$_2$ substrate and the SrM thin film by sputtering in a vacuum condition to form the Fe thin film having a thickness of 4 nm.

REFERENCE EXAMPLE 1

Manufacture of a Composite Structure

A composite structure including a Si/SiO$_2$ substrate, a SrM thin film (having a thickness of 60 nm), and a Fe thin film (having a thickness of 3 nm) was obtained in the same manner as Example 2, and then thermally treated in a vacuum at a pressure of $1\times10^{-6}$ Torr and a temperature of about 300° C. for 1 hour to form a soft magnetic exchange-coupled composite structure including the Si/SiO$_2$ substrate, the SrM thin film (having a thickness of 60 nm), the Fe thin film (having a thickness of 3 nm), and a Ti capping layer (having a thickness of 50 nm).

REFERENCE EXAMPLE 2

Manufacture of a Composite Structure

A composite structure including a Si/SiO$_2$ substrate, a SrM thin film (having a thickness of 60 nm), and a Fe thin film (having a thickness of 10 nm) was obtained in the same manner as Example 2, and then thermally treated in a vacuum at a pressure of $1\times10^{-6}$ Torr and a temperature of about 300° C. for 1 hour to form a soft magnetic exchange-coupled composite structure including the Si/SiO$_2$ substrate, the SrM thin film (having a thickness of 60 nm), the Fe thin film (having a thickness of 10 nm), and a Ti capping layer (having a thickness of 50 nm).

According to Reference Examples 1 and 2, amorphous Fe in a region adjacent to the SrM thin film was changed into crystalline Fe through the thermal treatment in vacuum, so that the crystalline Fe thin film was present in the region adjacent to the interface of the SrM thin film. As a result, due to soft magnetization, the composite structures of Reference Examples 1 and 2 had significantly low coercivities. Therefore, unlike the composite structures of Examples 1 to 3, the composite structures of Reference Examples 1 and 2 were found not to be suitable as hard magnetic materials for perpendicular magnetic recording media.

EVALUATION EXAMPLE 1

Measurement of Saturation Magnetization (Ms) and Coercivity

1) Examples 1 to 3 and Comparative Examples 1 and 2

Magnetization characteristics of the hard magnetic exchange-coupled composite structures of Examples 1 to 3 and Comparative Examples 1 and 2 were evaluated. The results are shown in FIG. 5.

Figure 5:
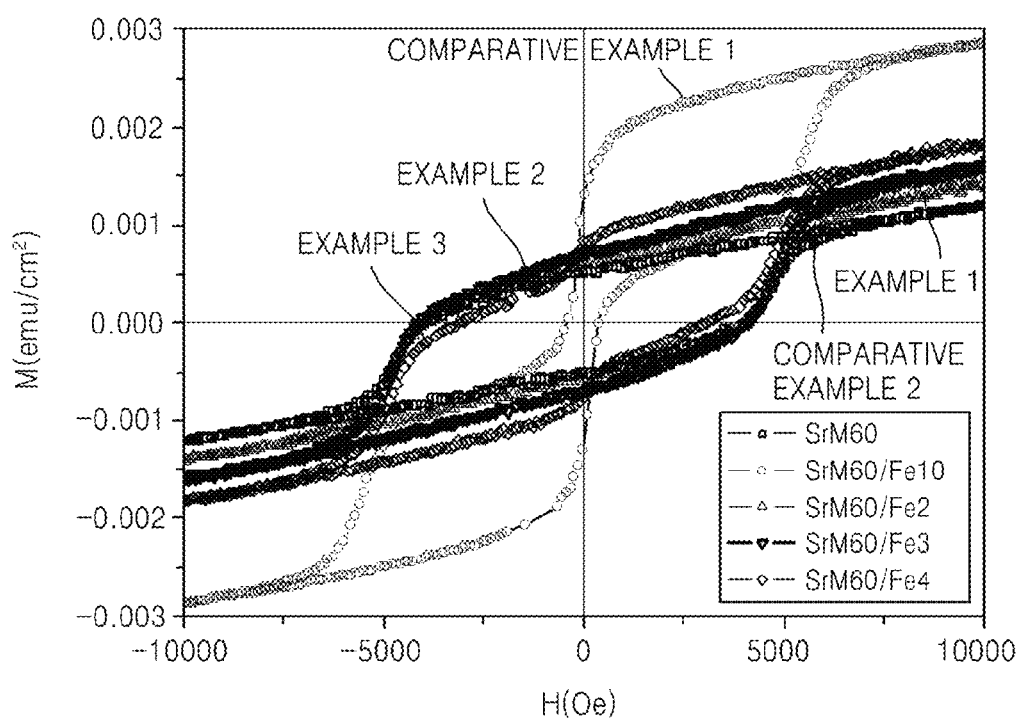

Referring to FIG. 5, the hard magnetic exchange-coupled composite structures of Examples 1 and 2 were found to retain coercivities due to a high saturation magnetization value of Fe, and to have an increased saturation magnetization value of the entire thin films, compared to the structure of Comparative Example 2. In addition, the structure of Comparative Example 1 was found to have an increased saturation magnetization value due to the increased thickness of Fe thin film, but a sharply reduced coercivity beyond the range scope of exchange magnetic coupling, indicating that the composite structure of Comparative Example 1 is not suitable for a hard magnetic device such as a perpendicular magnetic recording medium.

EVALUATION EXAMPLE 2

Analysis of TEM, TEM-EDAX, and STEM

The hard magnetic exchange-coupled composite structure of Example 2 was evaluated by analysis of transmission electron microscopy (TEM), transmission electron microscopy-energy dispersive X-ray analysis (TEM-EDAX), and scanning transmission electron microscopy (STEM). The results are shown in FIGS. 6 to 9

Figure 6:
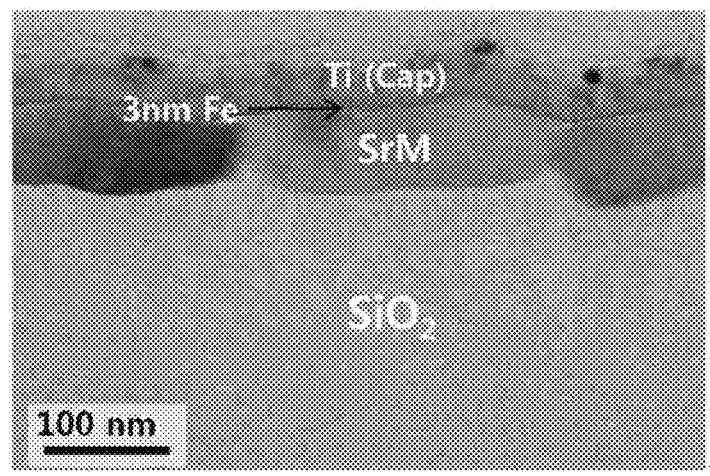

An analyzer Tecnai Titan manufactured by FEI Company was used for the TEM analysis, and an analyzer FEI Titan 80-300 manufactured by Philips Company was used for the TEM-EDAX analysis FIG. 6 is a bright field image of the entire thin film samples of hard magnetic exchange-coupled composite structure of Example 2.

Figure 7:
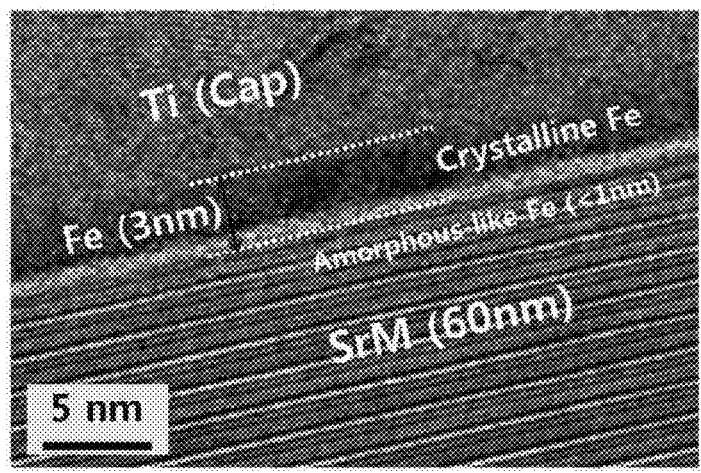
Figure 8:
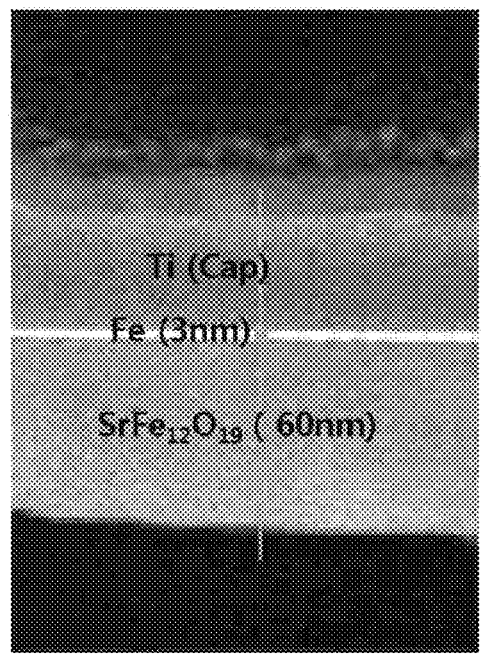
Figure 9:
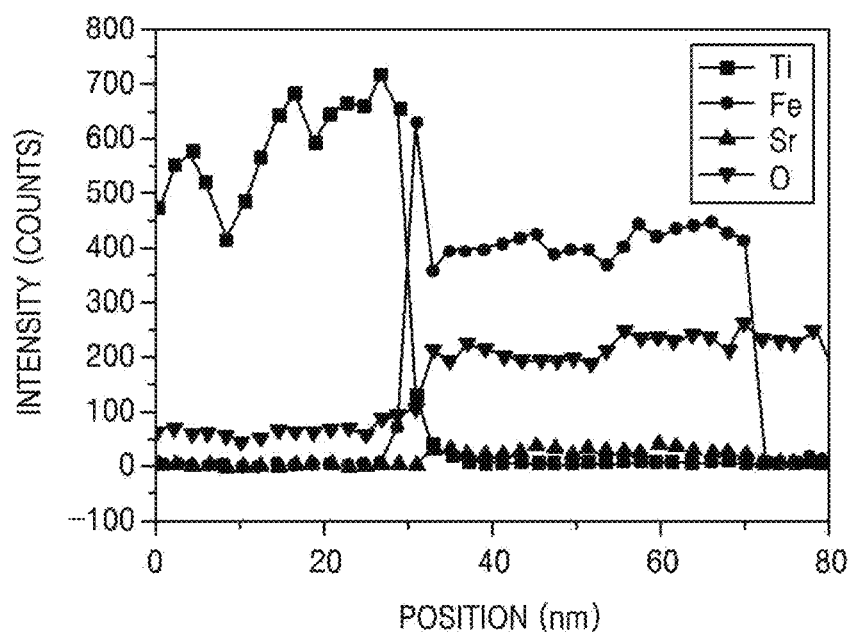

FIG. 7 is a high-resolution transmission electron microscope (HR-TEM) image of an interfacial region between SrM and Fe thin films in the hard magnetic exchange-coupled composite structure of Example 2. FIG. 8 is a scanning transmission electron microscope (STEM) z-contrast image illustrating different contrasts depending on a composition of the hard magnetic exchange-coupled composite structure of Example 2. FIG. 9 is an energy dispersive X-ray analysis (EDAX) line profile image illustrating a composition profile along a line shown in FIG. 8.

Referring to FIG. 7, in the hard magnetic exchange-coupled composite structure of Example 1, Fe and SrM appear as being bonded to each other by interfacial bonding on atomic scale, and Fe adjacent to the SrM interface is found to be amorphous. Referring to FIGS. 8 and 9, as the STEM z-contrast image and the EDAX composition line profile image of the same sample, respectively, the hard magnetic exchange-coupled composite structure of Example 2 is found to have a structure including a 3 nm-thick Fe film bonded on SrM.

The thicknesses of the SrM thin films, the soft magnetic Fe thin films, and the amorphous soft magnetic Fe thin films adjacent to the interface of the SrM thin films in the hard magnetic exchange-coupled composite structures of Examples 1 to 3 and in the structures of Comparative Examples 1 and 2 and Reference Examples 1 and 2 are shown in Table 1 below. The total thicknesses of the soft magnetic Fe thin films and the thicknesses of the amorphous soft magnetic Fe thin film were measured by TEM.

TABLE 1

| Example | Thickness of SrM thin film (nm) | Total thickness of Fe thin film (nm) | Thickness ratio between SrM thin film and Fe thin film | Thickness of amorphous Fe thin film (nm) |
|---|---|---|---|---|
| Example 1 | 60 | 2 | 30:1 | 0.8 |
| Example 2 | 60 | 3 | 20:1 | 0.8 |
| Example 3 | 60 | 4 | 15:1 | 0.8 |
| Comparative Example 1 | 60 | 10 | 6:1 | 0.8 |
| Comparative Example 2 | 60 | × | — | — |
| Reference Example 1 | 60 | 3 | 20:1 | × |
| Reference Example 2 | 60 | 10 | 6:1 | × |

As described above, according to the one or more of the above example embodiments, a hard magnetic exchange-coupled composite structure may maintain a high saturation magnetization value of a soft magnetic metal and have an increased coercivity due to hard magnetic ferrite. Accordingly, the hard magnetic exchange-coupled composite structure may have better high saturation magnetization characteristics compared to hard magnetic ferrite crystal grains, and may be used in a perpendicular magnetic recording medium.

It should be understood that example embodiments described therein should be considered in a descriptive sense only and not for purposes of limitation. Descriptions of features within each example embodiment should typically be considered as available for other similar features in other example embodiments.

What is claimed is:

1. A hard magnetic exchange-coupled composite structure, comprising:
   a ferrite crystal grain, the ferrite crystal grain having a first thin film structure; and
   a soft magnetic metal thin film bounded to the ferrite crystal grain by interfacial bonding on an atomic scale and having a thickness of about 5 nm or less, the soft magnetic metal thin film having a second thin film structure, wherein
   a region of the soft magnetic metal thin film adjacent to an interface with the ferrite crystal grain includes an amorphous soft magnetic metal thin film,
   the amorphous soft magnetic metal thin film has a third thin film structure, the third thin film structure being between the first thin film structure and the second thin film structure,
   the second thin film structure has one of a crystalline structure, a polycrystalline structure or a mixed amorphous and crystalline structure,
   the third thin film structure has a thickness in a range of about 0.1 nm to about 2 nm, and
   the second thin film structure has a thickness in a range of about 2 nm to about 4 nm.

2. The hard magnetic exchange-coupled composite structure of claim 1, wherein the amorphous soft magnetic metal thin film is within a 1 nm distance from the interface with the ferrite crystal grain, and the amorphous soft magnetic metal thin film is a main phase.

3. The hard magnetic exchange-coupled composite structure of claim 1, wherein the ferrite crystal grain is at least one selected from the group consisting of hexagonal ferrite, spinel ferrite, and garnet ferrite.

4. The hard magnetic exchange-coupled composite structure of claim 1, wherein the soft magnetic metal thin film is at least one selected from the group consisting of iron (Fe), cobalt (Co), nickel (Ni), and manganese (Mn), and an alloy thereof.

5. The hard magnetic exchange-coupled composite structure of claim 1, wherein
a thickness of the ferrite crystal grain is in a range of about 50 nm to about 500 nm.

6. The hard magnetic exchange-coupled composite structure of claim 1, further comprising:
a capping layer on the soft magnetic metal thin film.

7. The hard magnetic exchange-coupled composite structure of claim 6, wherein the capping layer includes at least one selected from the group consisting of tantalum (Ta), chromium (Cr), titanium (Ti), nickel (Ni), tungsten (W), ruthenium (Ru), palladium (Pd), platinum (Pt), zirconium (Zr), hafnium (Hf), silver (Ag), gold (Au), aluminum (Al), antimony (Sb), molybdenum (Mo), cobalt (Co), and tellurium (Te).

8. The hard magnetic exchange-coupled composite structure of claim 1, further comprising:
a passivation layer.

9. The hard magnetic exchange-coupled composite structure of claim 8, wherein the passivation layer includes at least one selected from the group consisting of aluminum oxide ($Al_2O_3$), magnesium oxide (MgO), titanium (Ti), aluminum (Al), and tantalum (Ta).

10. The hard magnetic exchange-coupled composite structure of claim 1,
wherein the ferrite crystal grain has an M-type hexagonal ferrite crystal grain thin film structure, and
wherein the amorphous soft magnetic metal thin film is an amorphous Fe or Fe-alloy thin film.

11. The hard magnetic exchange-coupled composite structure of claim 10, wherein a thickness of the M-type hexagonal ferrite crystal grain thin film structure is in a range of about 60 nm to about 100 nm.

12. The hard magnetic exchange-coupled composite structure of claim 10, wherein the M-type hexagonal ferrite crystal grain thin film structure includes $SrFe_{12}O_{19}$.

13. The hard magnetic exchange-coupled composite structure of claim 10, further comprising:
a capping layer having at least one selected from the group consisting of tantalum (Ta), chromium (Cr), titanium (Ti), nickel (Ni), tungsten (W), ruthenium (Ru), palladium (Pd), platinum (Pt), zirconium (Zr), hafnium (Hf), silver (Ag), gold (Au), aluminum (Al), antimony (Sb), molybdenum (Mo), cobalt (Co), and tellurium (Te).

14. A perpendicular magnetic recording medium, comprising:
the hard magnetic exchange-coupled composite structure according to claim 1.

15. The hard magnetic exchange-coupled composite structure of claim 1, wherein the third thin film structure has a thickness of about 0.8 nm.

16. The hard magnetic exchange-coupled composite structure of claim 1, wherein a ratio between a thickness of the first thin film structure and a thickness of the second thin film structure and the third thin film structure is 15:1 to 30:1.

* * * * *